US012707198B2

(12) United States Patent
Liu et al.

(10) Patent No.: US 12,707,198 B2
(45) Date of Patent: Aug. 11, 2026

(54) ACOUSTIC ECHO CANCELLATION SYSTEM AND ASSOCIATED METHOD

(71) Applicant: MediaTek Singapore Pte. Ltd., Singapore (SG)

(72) Inventors: Bozhong Liu, Singapore (SG); Xiaoxi Yu, Singapore (SG); Hantao Huang, Singapore (SG); Chia-Hsin Yang, Hsinchu City (TW); Li-Wei Cheng, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 417 days.

(21) Appl. No.: 18/230,676

(22) Filed: Aug. 7, 2023

(65) Prior Publication Data

US 2024/0048906 A1 Feb. 8, 2024

Related U.S. Application Data

(60) Provisional application No. 63/396,218, filed on Aug. 8, 2022.

(51) Int. Cl.
*G10L 21/0208* (2013.01)
*G10L 21/0216* (2013.01)
(Continued)

(52) U.S. Cl.
CPC ............ *H04R 3/02* (2013.01); *G10L 21/0216* (2013.01); *G10L 21/0264* (2013.01); *G10L 25/30* (2013.01); *G10L 2021/02082* (2013.01)

(58) Field of Classification Search
None
See application file for complete search history.

(56) References Cited

U.S. PATENT DOCUMENTS 11,727,912 B1 * 8/2023 Rao .................... G10L 21/0208 381/66
2020/0312346 A1 10/2020 Fazeli
(Continued)

FOREIGN PATENT DOCUMENTS

CN 114694672 A 7/2022

OTHER PUBLICATIONS

Zhang, Hao, and D. Wang. "Deep learning for acoustic echo cancellation in noisy and double-talk scenarios." Training 161.2 (2018): 322. (Year: 2018).*
(Continued)

*Primary Examiner* — Pierre Louis Desir
*Assistant Examiner* — Kristen Michelle Masters
(74) *Attorney, Agent, or Firm* — Winston Hsu

(57) ABSTRACT

An acoustic echo cancellation (AEC) system includes a loudspeaker interface coupled to a loudspeaker, a microphone interface coupled to a microphone, and a processor executing a model. The model is arranged to predict and generate a spectral magnitude mask (SMM) through a neural network according to a first microphone signal output by the loudspeaker and a second microphone signal output by the microphone, wherein a noisy speech signal is a sum of a clean speech signal and a noise signal; the SMM is a ratio of a spectral magnitude of an estimated speech signal and a spectral magnitude of the noisy speech signal; a true mask is a ratio of a spectral magnitude of the clean speech signal and the spectral magnitude of the noisy speech signal; and a loss function of the model is a mean square error between the SMM and the true mask.

8 Claims, 4 Drawing Sheets

(51) Int. Cl.

| | |
|---|---|
| ***G10L 21/0264*** | (2013.01) |
| ***G10L 25/30*** | (2013.01) |
| ***H04R 3/02*** | (2006.01) |

(56) References Cited

U.S. PATENT DOCUMENTS

| | | | | |
|---|---|---|---|---|
| 2021/0144472 | A1 | 5/2021 | Terashima | |
| 2022/0277721 | A1 | 9/2022 | Zhang | |
| 2023/0403505 | A1 * | 12/2023 | Yu | G06N 3/0442 |

OTHER PUBLICATIONS

Cutler et al., ICASSP 2022 Acoustic Echo Cancellation Challenge, Feb. 27, 2022, pp. 9107-9111, IEEE.
Westhausen et al., Acoustic Echo Cancellation With the Dual-Signal Transformation LSTM Network, Nov. 23, 2020, IEEE.

* cited by examiner

ACOUSTIC ECHO CANCELLATION SYSTEM AND ASSOCIATED METHOD

CROSS REFERENCE TO RELATED APPLICATIONS

This application claims the benefit of U.S. Provisional Application No. 63/396,218, filed on Aug. 8, 2022. The content of the application is incorporated herein by reference.

BACKGROUND

The present invention is related to acoustic echo cancellation (AEC), and more particularly, to an AEC system in which a loss function of a model is a mean square error between a true mask and a spectral magnitude mask (SMM).

Acoustic echo often occurs in audio/video calls if a far-end speaker's voice (e.g. a far-end microphone signal) is played by a near-end speaker and is picked up by a near-end microphone (e.g. a near-end microphone signal generated by the near-end microphone may include an echo signal and a clean speech signal). For a conventional AEC system, a model is trained and built through a neural network to predict and generate an estimated speech signal according to the far-end microphone signal and the near-end microphone signal, wherein the purpose of the training of the model is to minimize a difference between the estimated speech signal and the clean speech signal (e.g. a loss function of the model is a mean square error between the estimated speech signal and the clean speech signal). Some problems may occur, however. The loss function of the model in the conventional AEC system may have a larger loss range, which may reduce the training effect. As a result, a novel AEC system in which a loss function of a model is a mean square error between a true mask (which is a ratio of a spectral magnitude of the clean speech signal and a spectral magnitude of a noisy speech signal) and an SMM (which is a ratio of a spectral magnitude of the estimated speech signal and the spectral magnitude of the noisy speech signal) is urgently needed.

SUMMARY

It is therefore one of the objectives of the present invention to provide an AEC system in which a loss function of a model is a mean square error between a true mask and an SMM.

According to an embodiment of the present invention, an AEC system is provided. The AEC system comprises a loudspeaker interface, a microphone interface, and a processor. The loudspeaker interface is coupled to a loudspeaker. The microphone interface is coupled to a microphone. The processor is arranged to execute a model. The model is arranged to predict and generate an SMM through a neural network according to a first microphone signal output by the loudspeaker and a second microphone signal output by the microphone, wherein a noisy speech signal is a sum of a clean speech signal and a noise signal; the SMM is a ratio of a spectral magnitude of an estimated speech signal and a spectral magnitude of the noisy speech signal; a true mask is a ratio of a spectral magnitude of the clean speech signal and the spectral magnitude of the noisy speech signal; and a loss function of the model is a mean square error between the SMM and the true mask.

According to an embodiment of the present invention, an AEC method is provided. The AEC method comprises: executing a model to predict and generate an SMM through a neural network according to a first microphone signal output by a loudspeaker and a second microphone signal output by a microphone, wherein a noisy speech signal is a sum of a clean speech signal and a noise signal; the SMM is a ratio of a spectral magnitude of an estimated speech signal and a spectral magnitude of the noisy speech signal; a true mask is a ratio of a spectral magnitude of the clean speech signal and the spectral magnitude of the noisy speech signal; and a loss function of the model is a mean square error between the SMM and the true mask.

One of the benefits of the present invention is that, in the AEC system and associated method of the present invention, a loss function of an AEC model is a mean square error between an SMM and a true mask. Compared with a conventional model in which a loss function is a mean square error between an estimated speech signal and a clean speech signal, the loss range of the proposed AEC model can be reduced and the training effect of the proposed AEC model can be improved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
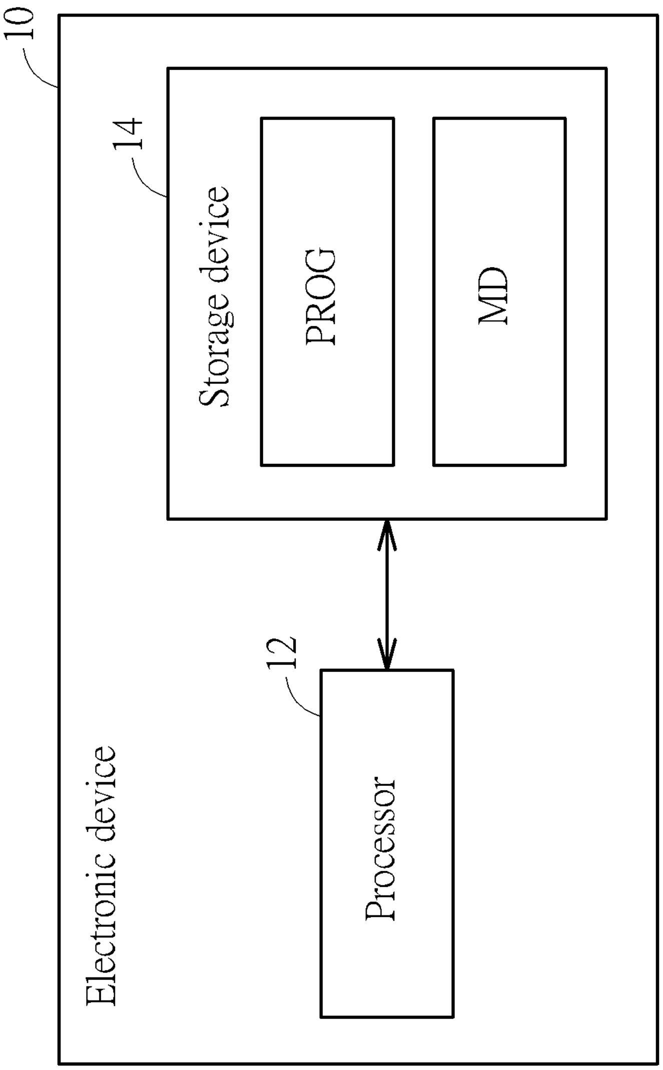
FIG. 1 is a diagram illustrating an electronic device according to an embodiment of the present invention.

FIG. 1 is a diagram illustrating an electronic device 10 according to an embodiment of the present invention. Byway of example, but not limitation, the electronic device 10 maybe a portable device such as a smartphone or a tablet. The electronic device 10 may include a processor 12 and a storage device 14. The processor 12 may be a single-core processor or a multi-core processor. The storage device 14 is a non-transitory machine-readable medium, and is arranged to store computer program code PROG and a model MD. The processor 12 is equipped with software execution capability. The computer program code PROG may include multiple artificial intelligence (AI)-based algorithms. When loaded and executed by the processor 12, the computer program code PROG instructs the processor 12 to train the model MD according to the AI-based algorithms. The electronic device may be regarded as a computer system using a computer program product that includes a computerreadable medium containing the computer program code PROG. Regarding a model in an acoustic echo cancellation (AEC) system as proposed by the present invention, it may be embodied on the electronic device 10. That is, the model MD may be an AEC model mentioned hereinafter.

Figure 2:
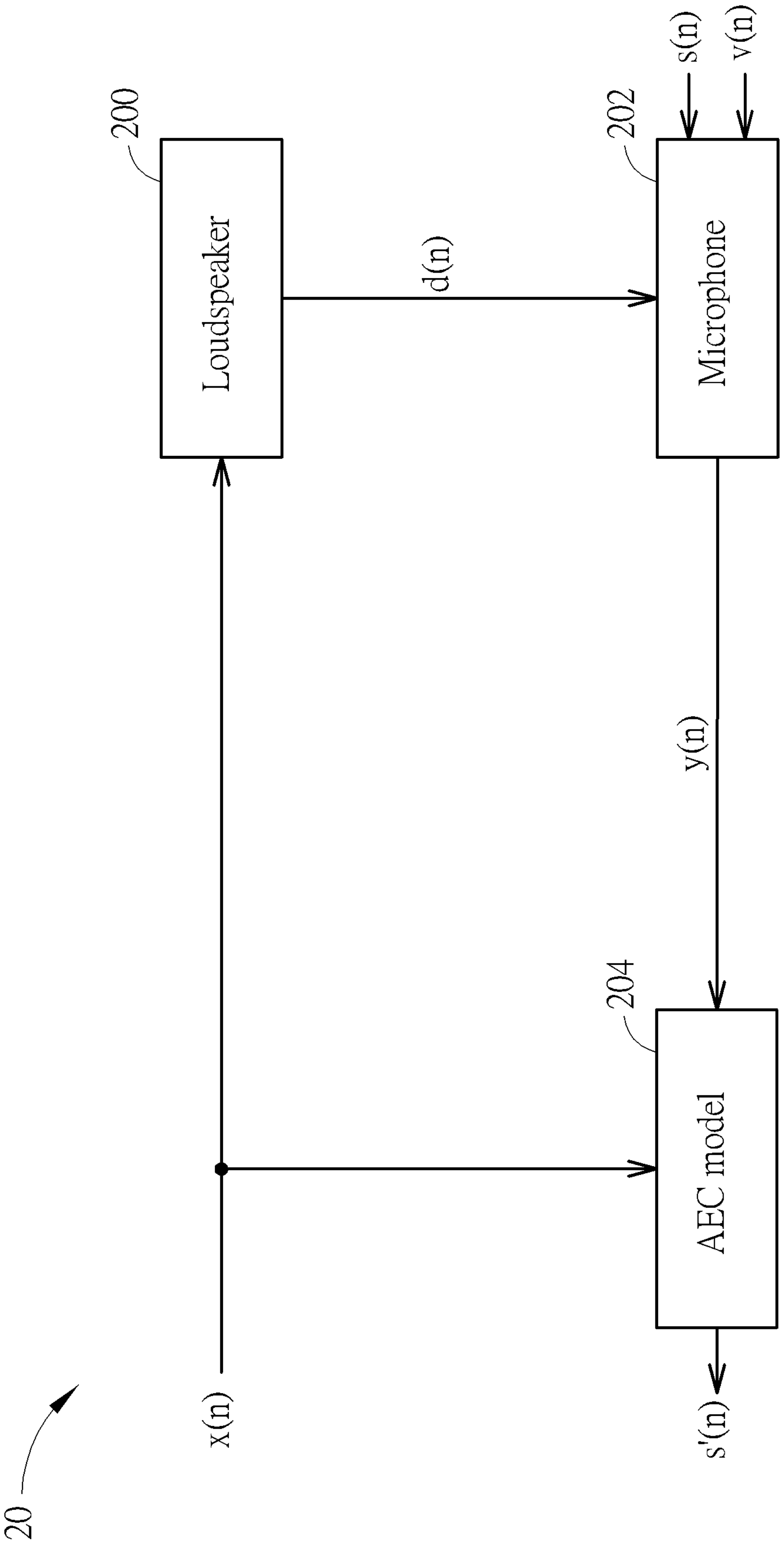
FIG. 2 is a diagram illustrating an acoustic echo cancellation (AEC) system according to an embodiment of the present invention.

FIG. 2 is a diagram illustrating an AEC system 20 according to an embodiment of the present invention. As shown in FIG. 2, the AEC system 20 may include a loudspeaker 200, a microphone 202, and an AEC model 204. The loudspeaker 200 may be arranged to receive and play a far-end microphone signal x(n), and the microphone 202 may be arranged to receive a speech signal s(n) and output a near-end microphone signal y(n), wherein the far-end microphone signal x(n) is not output from the microphone 202, an echo signal d(n) is transmitted from the loudspeaker 200 to the microphone 202, and an external noise signal v(n) may also be received by the microphone 202 (i.e. y(n)=d (n)+s(n)+v(n)).

Figure 3:
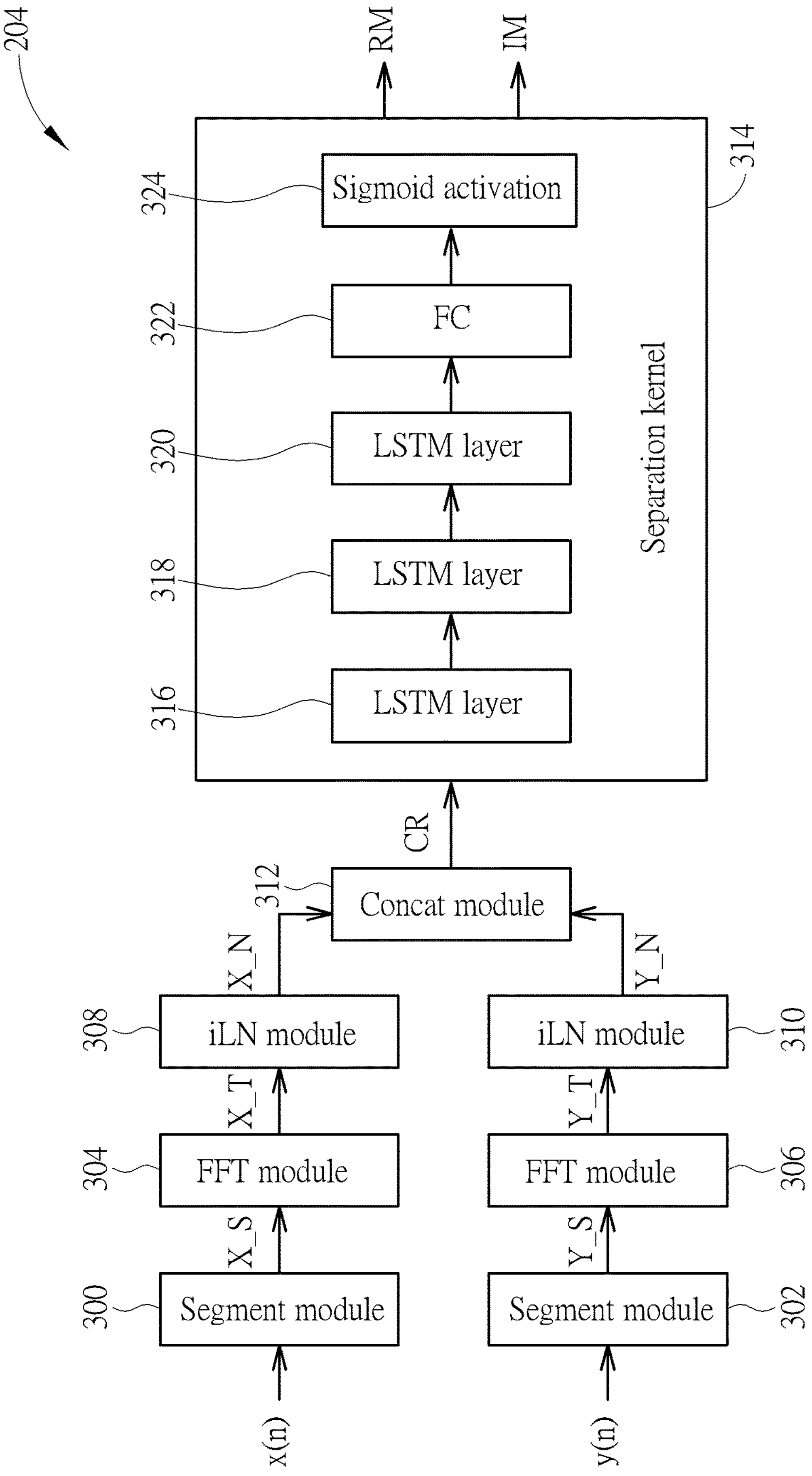
FIG. 3 is a diagram illustrating implementation details of the AEC model shown in FIG. 2 according to an embodiment of the present invention.

The AEC model 204 may be arranged to receive the far-end microphone signal x(n) and the near-end microphone signal y(n) through a loudspeaker interface (not shown) and a microphone interface (not shown) of the AEC system 20. The AEC model 204 may be arranged to predict and generate a spectral magnitude mask (SMM) through a neural network according to the far-end microphone signal x(n) and the near-end microphone signal y(n), for generating an estimated speech signal s' (n). Specifically, please refer to FIG. 3. FIG. 3 is a diagram illustrating implementation details of the AEC model 204 shown in FIG. 2 according to an embodiment of the present invention. As shown in FIG. 3, the AEC model 204 may include multiple segment modules 300 and 302, multiple fast Fourier transform (FFT) module 304 and 306, multiple instant layer normalization (iLN) modules 308 and 310, a concat module 312, and a separation kernel 314. The AEC model 204 may be arranged to perform short-time Fourier transform (SIFT) upon the far-end microphone signal x(n) and the near-end microphone signal y(n), respectively, to generate a first transformed microphone signal X_T and a second transformed microphone signal Y_T. For example, the segment module 300 may be arranged to split the far-end microphone signal x(n) to generate a first segmented microphone signal X_S, and the FFT module 304 may be arranged to perform FFT upon the first segmented microphone signal X_S to generate the first transformed microphone signal X_T. The segment module 302 may be arranged to split the near-end microphone signal y(n) to generate a second segmented microphone signal Y_S, and the FFT module 306 may be arranged to perform FFT upon the second segmented microphone signal Y_S to generate the second transformed microphone signal Y_T.

Afterwards, the AEC model 204 may be arranged to generate the SMM through the separation kernel 314 according to the first transformed microphone signal X_T and the second transformed microphone signal Y_T. In this embodiment, the separation kernel 314 may include multiple long short term memory (LSTM) layers (e.g. 3 LSTM layers 316-320) and a fully-connected layer 322 (labeled as "FC" in FIG. 3) with a sigmoid activation 324. The iLN module 308 may be arranged to normalize the first transformed microphone signal X_T to generate a first normalized microphone signal X_N. The iLN module 310 may be arranged to normalize the second transformed microphone signal Y_T to generate a second normalized microphone signal Y_N. The concat module 312 may be arranged to concatenate the first normalized microphone signal X_N and the second normalized microphone signal Y_N to generate a concatenated result CR. The separation kernel 314 may be arranged to predict and generate two masks (e.g. a real part mask RM and an imaginary part mask IM) according to the concatenated result CR through the LSTM layers 316-320 and the fully-connected layer 322 with the sigmoid activation 324, wherein the real part mask RM corresponds to magnitude information of the far-end microphone signal x(n) and the near-end microphone signal y(n), and the imaginary part mask IM corresponds to phase information of the far-end microphone signal x(n) and the near-end microphone signal y(n). In addition, the real part mask RM is a real part of the SMM, and the imaginary part mask IM is an imaginary part of the SMM (i.e. the SMM includes the real part mask RM and the imaginary mask IM). In this way, a real part of the estimated speech signal s'(n) can be obtained by multiplying the real part mask RM by a real part of the near-end microphone signal y(n), and an imaginary part of the estimated speech signal s'(n) can be obtained by multiplying the imaginary part mask IM by an imaginary part of the near-end microphone signal y(n).

Specifically, for the training of the AEC model 204, a noisy speech signal YSS (which may correspond to the near-end microphone signal y(n)) is a sum of a clean speech signal CSS (which may correspond to the speech signal s(n)) and a noise signal NSS (which may correspond to the external noise signal v(n) and the echo signal d(n)), that is, YSS=CSS+NSS. After the AEC model 204 is trained according to the AI-based algorithms, the SMM may be predicted and generated through the LSTM layers 316-320 and the fully-connected layer 322 with the sigmoid activation 324, wherein the SMM is equal to a ratio of a spectral magnitude S'(k, l) of the estimated speech signal s'(n) and a spectral magnitude Y(k, l) of the noisy speech signal YSS $$\left(\text{i.e. } SMM = \frac{|S'(k, l)|}{|Y(k, l)|}\right),$$

k is a frame index, and l is a frequency bin index.

In this embodiment, the training objective of the AEC model 204 is to minimize a difference between the SMM and a true mask, wherein the true mask is a ratio of a spectral magnitude S(k, l) of the clean speech signal CSS and the spectral magnitude Y(k, l) of the noisy speech signal YSS $$\left(\text{i.e. } SMM = \frac{|S(k, l)|}{|Y(k, l)|}\right).$$

In other words, a loss function $L_{maskMSE}$ of the AEC model 204 is a mean square error between the SMM and the true mask. Since the SMM includes the real part mask RM and the imaginary part mask IM, the loss function $L_{maskMSE}$ of the AEC model 204 is a sum of a mean square error between the real part mask RM and a real part of the true mask (labeled as "RT" in the following equation) and a mean square error between the imaginary part mask IM and an imaginary part of the true mask (labeled as "IT" in the following equation), which can be expressed by the following equation:

$$L_{maskMSE} = MSE(RT, RM) + MSE(IT, IM)$$

Figure 4:
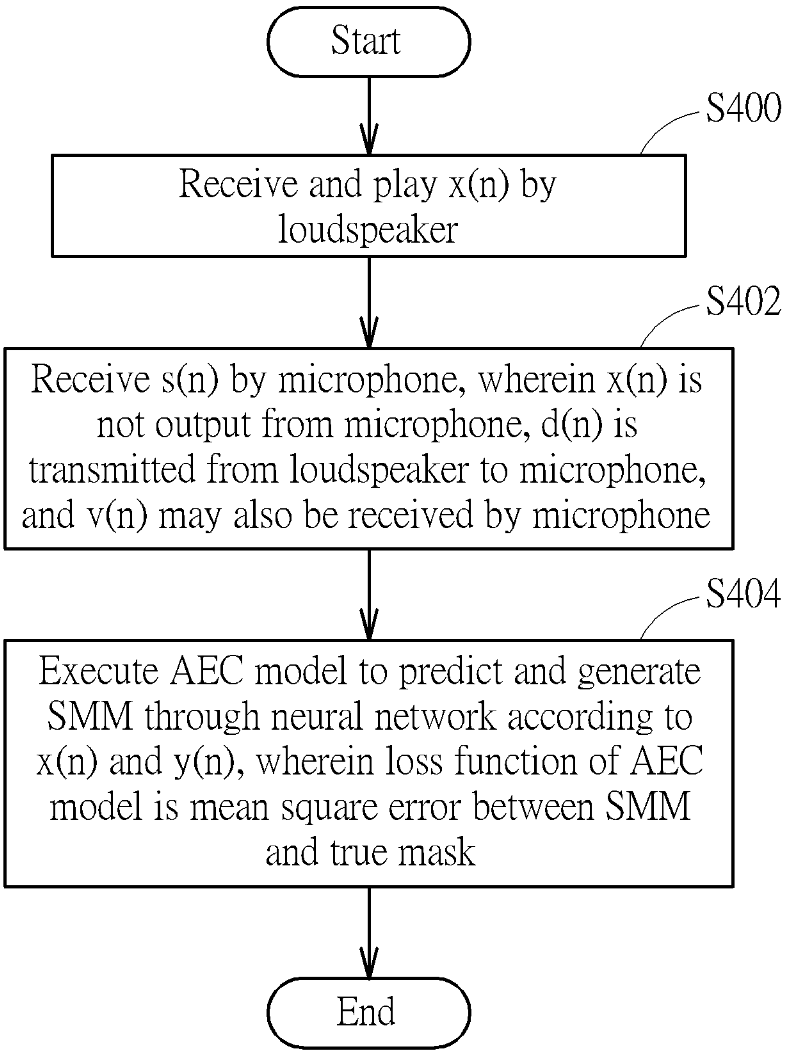
FIG. 4 is a flow chart of an AEC method according to an embodiment of the present invention.

FIG. 4 is a flow chart of an AEC method according to an embodiment of the present invention. Provided that the result is substantially the same, the steps are not required to be executed in the exact order shown in FIG. 4. For example, the AEC method shown in FIG. 4 may be employed by the AEC system 20 shown in FIG. 2.

In Step S400, the far-end microphone signal x(n) is received and played by the loudspeaker 200.

In Step 402, the speech signal s(n) is received and the near-end microphone signal y(n) is output by the microphone 202, wherein the far-end microphone signal x(n) is not output from the microphone 202, the echo signal d(n) is transmitted from the loudspeaker 200 to the microphone 202, and the external noise signal v(n) may also be received by the microphone 202.

In Step 404, the AEC model 204 is executed to predict and generate the SMM through the neural network according to the far-end microphone signal x(n) and the near-end microphone signal y(n), wherein the loss function $L_{maskMSE}$ of the AEC model 204 is a mean square error between the SMM and the true mask.

Since a person skilled in the pertinent art can readily understand details of the steps after reading above paragraphs directed to the AEC system 20 shown in FIG. 2, further description is omitted here for brevity.

In summary, in the AEC system 20 and associated method of the present invention, the loss function $L_{maskMSE}$ of the AEC model 204 is a mean square error between the SMM and the true mask. Compared with a conventional model in which a loss function is a mean square error between the estimated speech signal s' (n) and the clean speech signal CSS (e.g. the speech signal s(n)), the loss range of the proposed AEC model 204 can be reduced and the training effect of the proposed AEC model 204 can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An acoustic echo cancellation (AEC) system, comprising:

a loudspeaker interface, coupled to a loudspeaker;

a microphone interface, coupled to a microphone;

a processor, arranged to execute:

a model, arranged to predict and generate a spectral magnitude mask (SMM) through a neural network according to a first microphone signal output by the loudspeaker and a second microphone signal output by the microphone, for generating an estimated speech signal, wherein a noisy speech signal is a sum of a clean speech signal and a noise signal; the SMM is a ratio of a spectral magnitude of the estimated speech signal and a spectral magnitude of the noisy speech signal; a true mask is a ratio of a spectral magnitude of the clean speech signal and the spectral magnitude of the noisy speech signal; and a loss function of the model is a mean square error between the SMM and the true mask;

wherein the processor is further arranged to train the model by minimizing the loss function, for generating a trained model to generate the estimated speech signal;

wherein the SMM comprises a real part mask and an imaginary part mask; the real part mask is a real part of the SMM and the imaginary part mask is an imaginary part of the SMM; and the real part mask corresponds to magnitude information of the first microphone signal and the second microphone signal, the imaginary part mask corresponds to phase information of the first microphone signal and the second microphone signal, and the loss function of the model is a sum of a mean square error between the real part mask and a real part of the true mask and a mean square error between the imaginary part mask and an imaginary part of the true mask.

2. The AEC system of claim 1, wherein a real part of the estimated speech signal is obtained by multiplying the real part mask by a real part of the second microphone signal, and an imaginary part of the estimated speech signal is obtained by multiplying the imaginary part mask by an imaginary part of the second microphone signal.

3. The AEC system of claim 1, wherein the model comprises:

multiple segment modules, arranged to split the first microphone signal and the second microphone signal, respectively, to generate a first segmented microphone signal and a second segmented microphone signal;

multiple fast Fourier transform modules, arranged to perform fast Fourier transform upon the first segmented microphone signal and the second segmented microphone signal, respectively, to generate a first transformed microphone signal and a second transformed microphone signal;

multiple instant layer normalization (iLN) modules, arranged to normalize the first transformed microphone signal and the second transformed microphone signal, respectively, to generate a first normalized microphone signal and a second normalized microphone signal;

a concat module, arranged to concatenate the first normalized microphone signal and the second normalized microphone signal, to generate a concatenated result; and a separation kernel, arranged to predict and generate the SMM according to the concatenated result, wherein the estimated speech signal is generated according to the SMM.

4. The AEC system of claim 3, wherein the separation kernel comprises multiple long short term memory (LSTM) layers and a fully-connected layer with sigmoid activation, and the SMM is predicted and generated by the multiple LSTM layers and the fully-connected layer with sigmoid activation.

5. An acoustic echo cancellation (AEC) method, comprising:

executing a model to predict and generate a spectral magnitude mask (SMM) through a neural network according to a first microphone signal output by a loudspeaker and a second microphone signal output by a microphone, for generating an estimated speech signal, wherein a noisy speech signal is a sum of a clean speech signal and a noise signal; the SMM is a ratio of a spectral magnitude of the estimated speech signal and a spectral magnitude of the noisy speech signal; a true mask is a ratio of a spectral magnitude of the clean speech signal and the spectral magnitude of the noisy speech signal; and a loss function of the model is a mean square error between the SMM and the true mask;

wherein the method further comprises:

training the model by minimizing the loss function, for generating a trained model to generate the estimated speech signal;

wherein the SMM comprises a real part mask and an imaginary part mask; the real part mask is a real part of the SMM and the imaginary part mask is an imaginary part of the SMM; and the real part mask corresponds to magnitude information of the first microphone signal and the second microphone signal, the imaginary part mask corresponds to phase information of the first microphone signal and the second microphone signal, and the loss function of the model is a sum of a mean square error between the real part mask and a real part of the true mask and a mean square error between the imaginary part mask and an imaginary part of the true mask.

6. The AEC method of claim 5, wherein a real part of the estimated speech signal is obtained by multiplying the real part mask by a real part of the second microphone signal, and an imaginary part of the estimated speech signal is obtained by multiplying the imaginary part mask by an imaginary part of the second microphone signal.

7. The AEC method of claim 5, wherein the model is further arranged to perform steps of:

splitting the first microphone signal and the second microphone signal, respectively, to generate a first segmented microphone signal and a second segmented microphone signal;

performing fast Fourier transform upon the first segmented microphone signal and the second segmented microphone signal, respectively, to generate a first transformed microphone signal and a second transformed microphone signal;

normalizing the first transformed microphone signal and the second transformed microphone signal, respectively, to generate a first normalized microphone signal and a second normalized microphone signal;

concatenating the first normalized microphone signal and the second normalized microphone signal, to generate a concatenated result; and predicting and generating the SMM according to the concatenated result, wherein the estimated speech signal is generated according to the SMM.

8. The AEC method of claim 7, wherein the step of predicting and generating the SMM according to the concatenated result comprises:

predicting and generating the SMM by multiple long short term memory (LSTM) layers and a fully-connected layer with sigmoid activation.

* * * * *